D. BLY.

Piston Rod Adjuster.

No. 4,015.

Reissued June 7, 1870.

Witnesses:

Kate N. Jones

Rollin Germain

Inventor:

Douglas Bly,

Per J. Fraser & Co. atty's

N. PETERS, Photo-Lithographer, Washington, D. C.

UNITED STATES PATENT OFFICE.

DOUGLAS BLY, OF SHAMBOURG, PENNSYLVANIA.

IMPROVEMENT IN PISTON-ROD ADJUSTERS.

Specification forming part of Letters Patent No. 78,045, dated May 19, 1868; Reissue No. 4,015, dated June 7, 1870.

*To all whom it may concern:*

Be it known that I, DOUGLAS BLY, of Shamboug, in the county of Venango, in the State of Pennsylvania, late of Macon, Georgia, have invented an Improvement in Sucker-Rod Heads or Clamps for Artesian Wells, of which the following is a specification.

In deep-bored wells the connection between the line of sucker-rods connecting the piston (which is at the bottom of the well) and the working-beam consists of the connecting-rod attached to the working-beam, answering to an ordinary piston-rod, being smooth and polished, and working through a stuffing-box at the top of the well-tubing. To this rod are connected the sections of the "sucker-rod," extending to the piston in the working-barrel at the bottom of the tubing. Adjustment vertically by raising or lowering the sucker-rod and piston to place the latter in its proper position for working effectively in the barrel is required. It is necessary to the operation of the pump that the piston shall be inserted in the working-barrel and the valves adjusted to their proper relative positions. This barrel is situated at so great a depth that no measurement can be taken with sufficient accuracy to effect this. The piston must be forced down until it strikes the valve at the lower extremity of the barrel, and then drawn back the requisite distance. Much experiment is required to determine the best mode of pumping an oil-well. Sometimes a short and quick stroke of the piston is the most effective, at others a long and slow motion. Changes of the depth of the working-barrel in the well have to be made until it is ascertained what point yields the best. In doing this it is often necessary to cut the upper sections of sucker-rod to adapt it to the proper length, which involves the new application of the joint-irons to the cut portion, requiring much time and labor. It is one of the purposes of my invention to enable such adjustments to be made without cutting the sucker-rod, and thereby adapt the pumping mechanism to undergo the experimental changes of testing and working a well at different depths with ease and rapidity.

It is the object of my invention to obviate this difficulty; and it consists of a head or clamp and axis for connecting with the walking-beam of such construction as to enable the connecting-rod to be adjusted up or down indefinitely, and at the same time maintain the proper vertical position as the beam works up and down.

Figure 1:
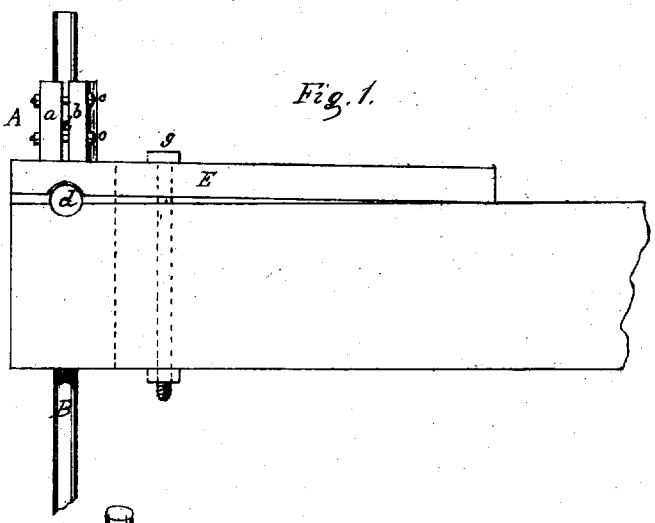
Figure 2:
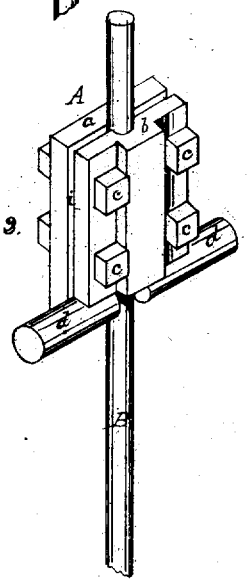
Figure 4:
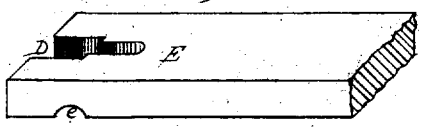
Figure 3:
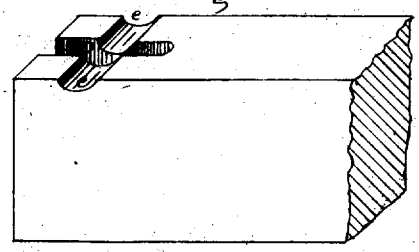

In the drawings, Figure 1 is a side elevation of my improved head or clamp, the end portion of the working-beam, and a part of the connecting-rod. Fig. 2 is a perspective view of the clamp and portion of the rod removed; Fig. 3, a perspective view of the end of the working-beam, and Fig. 4 of the plank or bearer E used therewith.

In the drawings, A indicates the head or clamp; B, the connecting-rod connecting the sucker-rod with the working-beam, and C the working-beam itself.

The head consists of two essential elements: first, the clamping part, by which it is connected with the rod so as to be capable of adjustment; second, the journal portion, by means of which a bearing is obtained in a suitable seat on the beam, and by which the proper position of the rod is maintained during the oscillations of the beam. The first of these consists preferably of two opposite metallic faces, *a b*, their proximate surfaces having hollow segments corresponding in some degree to the outside of the rod which they hold, said segmental cavities bearing such relation of size, curvature, or inclination to the rod as to admit of tightening the segmental portions upon the latter by compression. Such compression may be readily obtained by screw-bolts *c c*, passing through the parts, or by other means of effecting a firm hold upon the sides of the rod by compression of the inclosing portions, the means being unimportant so long as sufficient force is employed to make it effectual; but it is essential that there should be left a space, *i*, between the clamping-surfaces, so that indefinite pressure may be applied. When bolts are employed, one or more may be used on each side of the rod; but it is necessary to loosen that upon one side only to enable the rod to be moved, the jaws then opening as if hinged on the other bolt or bolts.

Connected with this clamp, or with one of the parts thereof, is an axis consisting preferably of the journals *d d*. These rest in suitable boxes or bearings, *e e*, provided on the upper surface of the beam. Upon the top of these rests a cap or bearing formed of a piece of plank or other suitable material, fitted in like manner to the journal, with its opposite end, *f*, in contact with the beam, and an intermediate bolt or bolts, *g*, passing downward through both, with a nut, by which the necessary pressure is obtained to retain the journal in its seat.

It will be seen that in operation, as the beam works up and down, the journals will allow the head or clamp to turn to adapt itself to the vertical position of the rod without binding. By this arrangement it will be perceived that the connecting-rod B can be adjusted up and down in the clamp in any degree desired. It is only necessary to loosen the bolts *c c* upon one or both sides, and raise or lower, as may be necessary, and then tighten again. There is no limit, therefore, to the vertical adjustment except the length of the rod itself. In this manner I am enabled to make the necessary adjustment of the piston and valves in deep wells by adjusting the clamp on the connecting-rod B.

When an alteration in the depth at which the well is pumped is necessary, as has been previously stated, the change is made by the removal or addition of sections of tubing and of sucker-rods in the usual way, and the connecting-rod B is adjusted in the clamp A to readjust the piston and working-valve to the new situation of the pump-barrel, thus obviating the necessity of cutting the rods, as previously described.

In pumping oil-wells the rods have to be withdrawn every few days, in order to replace the leather valves as they become worn. As the proper position of the piston in the barrel is obtained (in wells of great depth) with much difficulty, its loss by the removal of the rods occasions much inconvenience, and it is important to be able to indicate the position in such a manner that it can be accurately replaced. I provide for this as follows: Instead of a hole through the beam for the passage of the rod B, I make a vertical longitudinal slot, D, of sufficient depth, in which the rod works. Having ascertained and placed the piston at its proper working depth, I fix the clamp firmly to the rod and seat it in its bearing *e e* on the beam. When necessary to withdraw the rods, I do not disconnect the clamp from the rod, as by so doing the adjustment of the piston would be lost; but, instead thereof, I merely loosen the bolt or bolts *g* sufficiently to raise it enough to allow the journal to be unseated, and pass the rod B horizontally out of the open end of the slot, when it is unscrewed from the sucker-rods and they are drawn. To be replaced, the rod is connected, returned to its seat, the bearer tightened, and the well is in pumping order at once. This method is very simple and convenient, not a single bolt or nut having to be removed. The head may be inverted and operate in the same manner.

I claim as my invention—

1. An adjustable clamp or coupling having an axis journal or journals, *d d*, for so connecting with the working-beam as to conform to the vertical position of the pump-rod during the oscillations of the beam, as set forth.

2. The combination of the axis or journal of an adjustable pump-rod coupling with a working-beam having an opening or slot, D, in the end for the passage or adjustment of the rod, as and for the purposes set forth.

3. The combination of a pump-rod or connecting sucker-rod with an adjustable clamp, substantially as set forth.

4. The movable cap or bearing E, with one end resting upon the journal *d d*, and the other upon the beam, and intermediately bolted thereto, substantially as set forth.

DOUGLAS BLY.

Witnesses:
J. FRASER,
KATE N. JONES.